United States Patent [19]

Kunchal et al.

[11] 4,145,191
[45] Mar. 20, 1979

[54] GAS STREAM CLEANING SYSTEM AND METHOD

[76] Inventors: S. Kumar Kunchal, 300 Enterprise Bldg., Grand Junction, Colo. 81501; Louis J. Erck, Anvil Points; Harry A. Harris, No. 25 Anvil Points, both of Rifle, Colo. 81650

[21] Appl. No.: 787,299

[22] Filed: Apr. 13, 1977

[51] Int. Cl.² ............................................. B03C 3/01
[52] U.S. Cl. ........................................... 55/4; 55/8; 55/10; 55/11; 55/89; 55/90; 55/94; 261/128; 261/131
[58] Field of Search .................... 55/4, 6–11, 55/18, 20, 89, 90, 94, 106, 135; 261/128, 131

[56] References Cited

U.S. PATENT DOCUMENTS

| | | | |
|---|---|---|---|
| 2,184,782 | 12/1939 | Scott et al. | 55/8 |
| 2,742,974 | 4/1956 | Landgraf | 55/10 |
| 2,911,061 | 11/1959 | Petersen | 55/106 X |
| 2,972,393 | 2/1961 | Bush | 55/89 X |
| 3,050,919 | 8/1962 | Tailor | 55/90 |
| 3,059,393 | 10/1962 | Allred | 55/89 X |
| 3,800,505 | 4/1974 | Tarves, Jr. | 55/11 X |

Primary Examiner—Frank W. Lutter
Assistant Examiner—Kathleen J. Prunner
Attorney, Agent, or Firm—Richard D. Law

[57] ABSTRACT

An oil mist and solid particle laden gas from an oil shale retorting operation is initially treated with a temperature controlled oil spray and then by a coalescer to reduce the quantity of oil mist and remove most of the solid particle content of the gas stream and then finally treated by an electrostatic precipitator to essentially remove the oil mist remaining in the gas.

6 Claims, 3 Drawing Figures

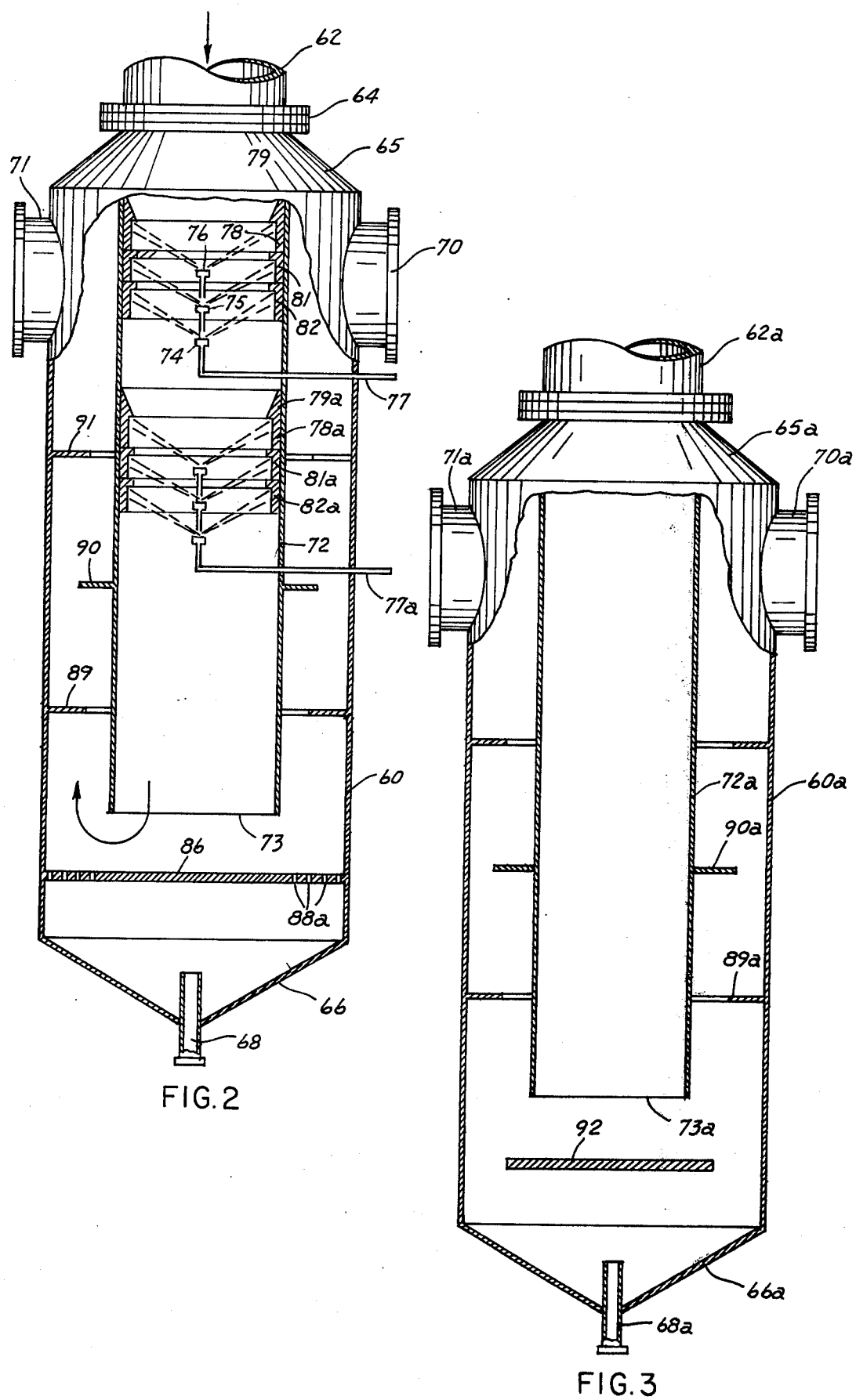

GAS STREAM CLEANING SYSTEM AND METHOD

This invention relates to a gas stream cleaning system and more particularly to removal of liquid and solid particles entrained in a gas stream, which is one of the resulting products of an oil shale retorting method.

Oil shale, that is, a rock or mineral commonly called shale is found in many parts of the world, with substantial beds of the oil shale particularly found in Colo., Wyo., and Utah. Small size commercial operations for recovering oil from the oil shale have been carried out in many countries including the United States. However, currently there are no large commercial plants in the United States or elsewhere. With the depletion of easily available petroleum, substantial amounts of research have been conducted for the recovery of shale oil from such rock.

The organic material in oil shale, when subjected to a pyrolysis treatment is converted to some permanent gas, some condensable gas, and a liquid called shale oil. The retorting of the oil shale is normally on the order of 900° F. or more to convert the organic material of the rock to oil. Two general types of retorting processes have been used with a vertical shaft vessel. First is the direct combustion process, in which an oxygen containing gas is forced through a bed of crushed oil shale to cause an actual combustion, in a shale bed, of some of the carbon in the shale to produce the heat necessary for the pyrolysis of the kerogen. The second process is an indirect heating retorting, in which a non-oxygenous gas, heated externally of the vessel, is introduced into crushed shale to heat the shale and cause a pyrolysis of the kerogen. In both processes, the system is preferably maintained at flow rates and a temperature so that a stream of gas issues from the bed of crushed shale entraining a mist and dust particles.

The pyrolysis of the organic material in oil shale in its fundamental aspects, appears to be a relatively simple operation. The process involves heating the shale to a temperature causing a pyrolysis of the kerogen and then recovering the products which are emitted from the process. In practical application, however, this apparently simple operation has not acheived a large scale commercial application even though dozens of types of processes and literally dozens of types of equipment have been devised for the oil shale retorting process. The two types of processes described above, generally, produce a mist of liquid droplets in the various gases which are introduced into the shale as well as the produced gases from the pyrolysis. To provide an effective process, the oil shale mist must be separated from the gas, as well as any carried over dust particles.

In this separation of small, solid particles, as well as small, liquid particles entrained in a flow of gas or vapor, normally called disperoids, an electrostatic precipitator is frequently used. As the quantity of the solid and liquid in the disperoids decreases, the efficiency of the electrostatic precipitator may decrease sharply. Certain characteristics of the particles may, also, decrease the efficiency of the electrostatic precipitator. It has generally been found that the best mode of operation of the electrostatic precipitator is at a uniform temperature with a generally fixed percentage of particles dispersed in the gas, as well as a fixed, generally known size of particles. Changes in operation that produce the disperoids may vary considerably, and with such variations the efficiency of the electrostatic precipitator changes drastically.

In many of the oil shale retorting systems there is a variable quantity of the solid and liquid particles entrained in the gas stream as the qualitative and quantitative conditions of the process, which produces them, changes. In the retorting of oil shales which produces an elevated temperature gas-vapor stream having substantial solid and liquid materials entrained therein, the parameters of the retorting procedure determine the quantity of the generated dust particles entrained in the gas. The parameters, also, determine the quantity and the size of the oil droplets entrained as a mist in a produced vapor or gases in addition to the process gas stream. The changing conditions of retorting, also, changes the operation of the electrostatic precipitator by changes in the disperoids. It has been found in actual practice that the increase in quantity of solid dispersicants has a detrimental effect on the operation of the electrostatic precipitator. Higher temperatures of the in going stream to the electrostatic precipitator changes its operation and efficiency.

According to the present invention there is provided a system for cleaning a gas stream from an oil shale retorting process. The system includes a liquid spray for initially treating the gas stream followed by a mechanical separation of major quantities of the entrained material, removing most of the solid particles and coalescing a substantial amount of the liquid droplets in the mist. A relatively clean gas stream under temperature control is passed to an electrostatic precipitator where essentially all of the remaining materials are removed from the gas.

Included among the objects and advantages the present invention is to provide a gas stream cleaning system for gas streams having relatively large quantities of dust particles as well as liquid droplets entrained therein.

Another object of the invention is to provide a simple, effective unit for cleaning a gas stream of solid and liquid dispersants.

A further object of the invention is to provide a system for cleaning an oil shale retorting gas stream which utilizes an initial spray wash and mechanical separation followed by electrostatic precipitation.

A still further object of the invention is to provide a gas stream cleaning device providing a temperature control for the gas stream, initial removal of solid and some liquid particles from the gas stream and finally electrostatic precipitation of the dispersants in the gas stream in a highly efficient process.

These and other objects and advantages of the invention may be readily acertained by referring to the following description and appended illustrations in which:

FIG. 2 is a side elevational view, partly cut away, of a spray arrangement and coalescer according to the invention.

FIG. 3 is a side elevational view of a modified form of coalescer according to the invention.

Figure 1:
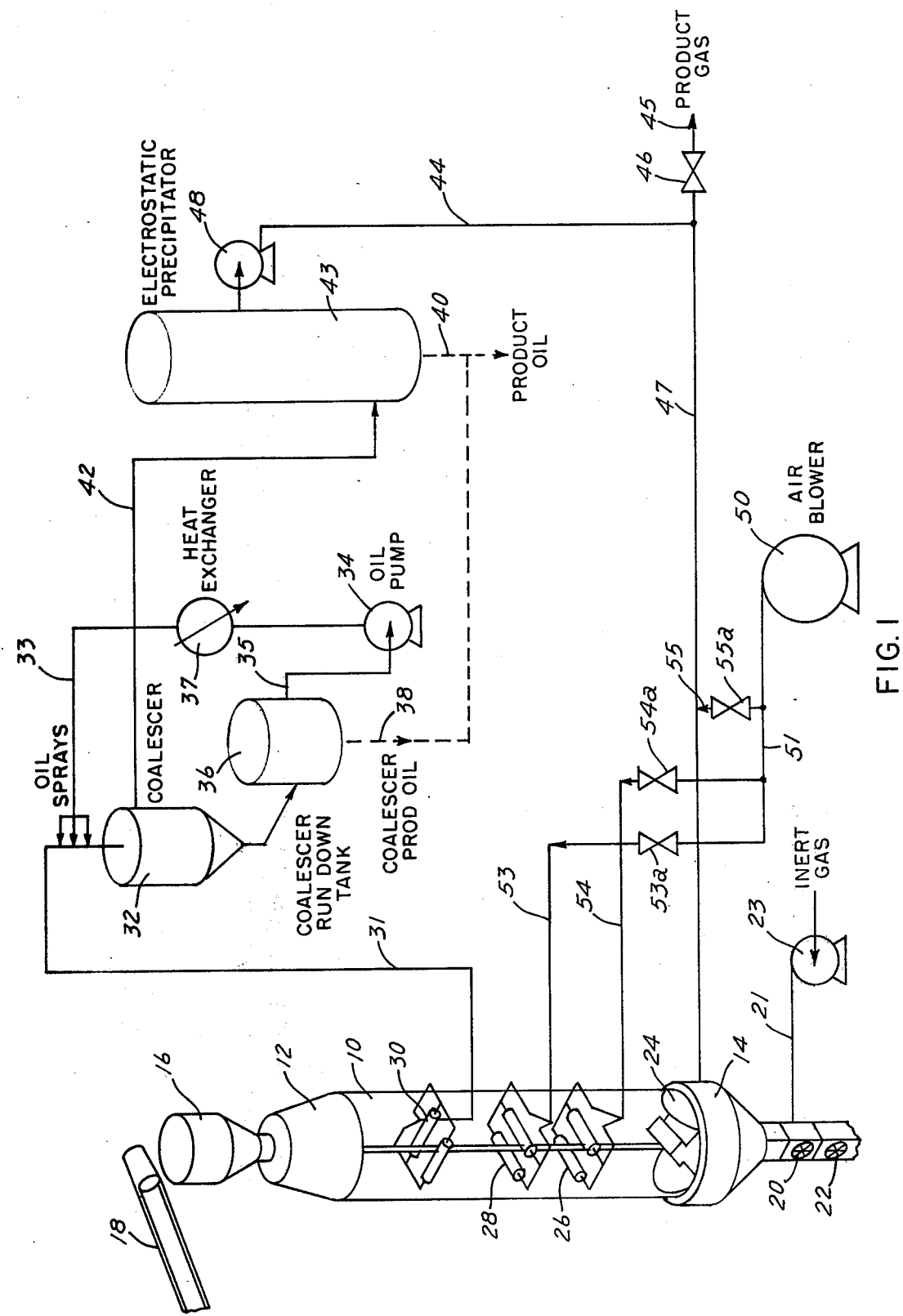
FIG. 1 is a schematic flow diagram of an oil shale retorting process utilizing the gas stream cleaning system of the invention.

A kiln, according to a preferred form of the invention, is a vertical shaft vessel, common to calcining and retorting arts, having a top feed for crushed rock and a bottom discharge for retorted rock, which is arranged to discharge solids from the vessel at a rate to maintain a moving, but essentially constant depth of bed in the vessel. Various gases are introduced into the kiln at various positions, with gas distributors provided between the top and bottom of the kiln. Such a distributor as shown in U.S. Pat. No. 3,432,348, Issued Mar. 11, 1969 may be used for providing a laterally uniform distribution of gas across the vessel. One means for withdrawing the shale from the bottom of the vessel, commonly called a grate, is shown in U.S. Pat. No. 3,401,992 Issued Sept. 17, 1968 entitled "Linear Grate For Shaft Kiln." The grate and the gas distribution means provide an excellent system for the uniform flow of solids through the kiln, so as to provide treatment of the solids with the gases of the process. The solid feed size, for one type of oil shale processing, consists of from ½ inch to 2½ inches, providing the void spaces in the bed at about 40 percent. With continuous movement of the bed there is particle to particle contact readjustment, but the void space essentially remains constant. By maintaining a uniform flow of shale through the vessel, a combustion may be initiated in a particular zone and it may be maintained in that zone by careful control of the gases introduced in the vessel. The heat produced by the combination of the combustion is transferred in to the upper raw shale for retorting. The induced gas, as well as the produced gas and a mist of the oil is withdrawn from the kiln at the top of the raw shale bed. The gas processing includes removal of the solids and liquids, and processing of some of the gas for return to the vessel.

In the system shown in FIG. 1, a vertical kiln 10, shown schematically to expose the inside, generally consists of a metal skin with a refractory lining, not shown, as is common in the art. The kiln is provided with a top cone 12 and a bottom cone 14 including withdrawal means (not shown) secured to the ends of the vertical cylindrical member. A feed hopper 16, fed by a belt conveyor 18 provides a gravity flow of crushed shale in to the vessel. A pair of star feeders 20 and 22 mounted on the outlet end 14 of the vessel provides means for withdrawing retorted shale from the kiln. A grate mechanism, not shown, is mounted in the lower end 14 below a bottom gas inlet 24 which includes means for introducing gas into the bottom of the column of shale. The first set of gas distributors 26 is mounted in the vessel substantially above the bottom distributors 24, and a second set of distributors 28 is mounted thereabove. An off-gas collection system in provided above the upper distributor system 28 and provides means for withdrawing gases and mist from the retorting. In one highly effective size, which has been used for substantial periods of time, a nominal ten foot diameter kiln with an overall heighth of about 50½ feet is provided with a bed of shale at the heighth of approximately 27 feet from the lowest point of the bed to the operating upper, stable surface level thereof. The vessel is lined with refractory giving an effective inside diameter of 8½ feet. The lower gas inlet is just above the grate, and the next or middle distributor is about twelve feet above the lowest part of the bed. The upper distributor is about six feed above the middle distributor. The formed gas and oil mist may be withdrawn through off-gas distributors or through ports in the top of the kiln after disengagment of the gas and mist from the top surface of the shale bed. In either case, the depth of the bed above the top distributor is closely controlled, to provide heating of the incoming raw shale and the cooling of the produced products to form a stable mist which is withdrawn. The products cannot be cooled to a temperature gradient such that there is condensation and coalescing of oil on the cool shale. Such action causes oil refluxing, leading to bridging, coking, blockages, etc. A temperature of 125°–150° F. results in a stable mist which may be removed from the vessel for processing. A high velocity of the gas may carry out shale dust as an entrained solid, or may cause mist impaction against the shale, and thus the velocity of the gas has an upper limit.

Raw shale is introduced into the kiln through lock means which prevents escape of the gaseous products and the mist, by known devices, for example, rotary feeders, star feeders, and the like, and the shale is withdrawn from the unit using similar feeders for preventing a release of gas from the bottom of the vessel during operation. Inert gas may be inserted through the lines 21 to pressurize the rotary feeders and prevent loss of gas through the bottom of the vessel. The inert gas is controlled by a blower 23.

The gas and oil mist produced by the retorting is withdrawn from the bed through off-gas collector system 30 through a line 31 into a coalescer 32. Recovered oil from the coalescer is passed into a coalescer rundown tank 36. Oil, cooled to a predetermined temperature by heat exchanger 37, from a pump 34 is fed to a line 33 to a series of oil sprays, explained below. Oil from the coalescer rundown tank 36 passes through line 35 to the pump 34. The heat exchanger 37 provides means for controlling the temperature of the oil sprayed into the lines entering the coalescer in the range of 125°–150° F., and thereby controlling the temperature of the mist entering the coalescer. Product oil from the run-down tank passes line 38 where it is combined with product oil in the line 40. The coalescer removes a substantial portion of the oil mist from the gas/mist combination by intimate contact of the oil spray with the larger oil droplets and dust. The coalescer reduces the shale oil mist content of the gas to about half of the original gas content produced by the retorting. The gas from the coalescer containing a small amount of the mist, in smaller oil droplets, and essentially no dust, passes out through line 42 into an electrostatic precipitator 43. In the electrostatic precipitator the remaining liquid droplets are removed from the gas. The generally liquid free gas passes through line 44 from a recycle blower 48 and then a portion of the gas passes to a gas production line 45 controlled by a valve 46. The portion of the gas in line 44 passing through a line 47 into the bottom of the kiln is the recycled gas stream.

Air is introduced into the two internal distributor systems in the kiln from the blower 50 through line 51 which serves as a manifold to line 53, connected to the upper distributors 28, and line 54, connected to the lower distributors 26, respectively controlled by valves 53a and 54a. The line 47 in a like manner may be fed air by means of line 55 controlled by valve 55a.

The distributors are mounted laterally in the kiln and are tubular members fed from both ends. Gas is released from the distributors through a series of orifices along the sides of the tubular members. The size and spacing of the orifices are arranged to inject a predetermined quantity of gas into the lateral area serviced by the particular orifice.

The coalescer shown in FIG. 2 provides an effective means for cleaning the gas-mist combination passing to the electrostatic precipitator. This unit includes an exterior tubular housing 60 arranged to be mounted in an essentially vertical position. The housing 60 includes a dispersoid inlet pipe 62 mounted by means of flange assembly 64 to a head 65 of the tubular member. The bottom of the tubular member 60 is closed by head 66 through which a drain pipe 68 passes. A conventional outlet with a valve control may be used. Flanged gas outlets 70 and 71 provide the means for securing the unit in a gas line, which normally leads to an electrostatic precipitator, as shown in FIG. 1. The interior tubular member 72 is secured, for communication, with the inlet 62 for passage of dispersoids through the tube 72 to its open end 73. In the upper end of the inner tube 72 there is a series of three spray-heads (or sprayers) 74, 75, and 76, mounted one above the other and fed by a common liquid line manifold 77. The line 77 passes through the wall of the outer container 60 and through the wall of the inner member 72. The number of spray-heads (or sprayers) is determined by the particular operation. An upper impingement plate 78 secured to the wall of the inner tube 72, provides an impingement ring for liquid spray emerging through the spray head 76. Similar plates 81 and 82 may be provided by spray 75 and 74 respectively. A similar section immediately below the upper spray section is provided with similar spray-heads fed by an inlet line 77a. Each of the spray-heads is arranged to impinge on the wall of the inner member, and this may include an impingement device with a very slightly inturned flange for breaking up the spray, such as plates 78a with its inward flange 79a, and impingement plates 81a and 82a. The spray-heads of each spray section form hollow, wide angle cone sprays, such as diagramatically shown in FIG. 2. The spray is emitted outwardly and upwardly having a cone apex angle at around 110° with the spray angle directed about 35° above horizontal.

The spray sets may be arranged with two or more spray-heads, three in each set being shown. Furthermore, two or more sets of sprays may be provided in the inner member, depending upon the condition of the dispersoids in the gas stream flowing through the cleaning device. In an actual test, the off-gas from an oil retort was treated prior to its entrance to an electrostatic precipitator using a 16 inch diameter inlet pipe with from 875 to 1,000 cubic feet per minute of the dispersoid passing through the unit. A spray of oil emitted from each of the spray heads ranged from 12 to 14 gallons per minute at about 60 to 80 p.s.i. The quantity of gas to liquid ranged from 60 to 70 c.f.m. of gas per gallon of spray. By controlling the volume and temperature of the oil sprayed into the stream, for example 150° F., the gas exiting from the cleaning device is cooled to about 150°, and a substantial portion of the solid material and the oil mist in the dispersoid is removed in the process.

The gas passing down the inlet pipe 62 passes through the inner member through the two spray zones and exhausts through the open end 73 of the inner member 72 and impinges upon impingement plate 86. The plate 86 has a plurality of holes 88a near the periphery to permit the separated oil to pass into the head 66. The gas passes upwardly around the outside of the tube 72 in a circuitous route past a first annulus 89 secured to the tank, a baffle 90 secured to tube 72, then an annulus 91 secured to the tank, all at spaced positions. This provides for the circuitous route of the gas in the annulus between the tube and the tank. The flow interruption by change of direction and impingement of the stream aids in the coalescing of the liquid and the removal of solids. The impingement against the various plates causes a change in direction and a change in velocity, and creates turbulence which is also involved in the coalescing, precipitation, etc. of the particles from the dispersoids. It is to be noted that the outlets for the gas passing out of the cleaning unit are larger than the inlet, providing a reduction of velocity of the gas which aids in the separation on entrained material from the gas.

In some instances it may be that the oil sprays may be placed in the pipe above the tank inlet, so that the inner tube is an open tube directing the gas against an impingement plate. Such a device is shown in FIG. 3 where a tank 60a is provided with an inner tube 72a. Gas which has passed through a series of sprays enters the inlet 62a flowing past the head 65a and down the inner tube 72a. This mixture impinges upon plate 92 upon exhausting from the outlet 73a. Separated oil flows around the impingement plate into the head 66a, for subsequent discharge through the outlet 68a. Baffle plates 89a, 90a, etc. placed in the annulus between the inner member and the outer member, as before, provide a circuitous route for the gas passing up the annulus to the gas outlets 71a and 70a of the vessel.

During an actual, long term run of a vessel, of the size given above, the following tables show the results of gas/mist treatment and a characterization of the mist at various stages. The tests were conducted with the direct heating mode of retorting. With indirect heating mode the off-gas is normally at a higher temperature than direct heating, so the sprays of oil require careful control.

Table 1

| | | | Coalescer and ESP Oil Recovery | | | | | | |
|---|---|---|---|---|---|---|---|---|---|
| | | | Coalescer | | | E.S.P. | | | % Wet |
| Run | Coalescer Oil (wet) Recovery | ESP Oil (wet) Recovery | H₂O Wt % | Sed. ML/100g | Vis. at 130° SSU | H₂O Wt % | Sed. ML/100g | Vis. at 130° SSU | Oil Collected in Coal. |
| 1. | 348 | 1216 | .52 | 1.23 | 108.8 | .95 | .35 | 94.6 | 22.2 |
|    | 2535 | 3402 | 5.78 | 1.92 | 106.0 | 3.74 | .19 | 105.3 | 42.7 |
| 2. | 2542 | 4818 | 2.95 | .90 | 92.2 | 4.33 | .34 | 88.6 | 34.5 |
| 3. | 3561 | 4265 | 2.34 | .73 | 95.0 | 4.27 | .35 | 91.7 | 45.5 |
| 4. | 3743 | 4403 | 3.30 | .67 | 92.4 | 5.21 | .26 | 84.6 | 45.9 |
| 5. | 3603 | 3595 | 1.52 | .34 | 90.0 | 6.07 | .37 | 90.7 | 50.1 |
| 6. | 3180 | 3773 | 2.54 | .35 | 93.1 | 6.93 | .30 | 88.6 | 45.7 |
| 7. | 3172 | 3654 | 1.40 | .19 | 94.2 | 3.57 | .09 | 87.1 | 46.5 |
| 8. | 3172 | 3795 | 1.49 | .85 | 93.3 | 2.38 | .21 | 87.1 | 45.5 |
| 9. | 3165 | 3869 | 2.85 | .62 | 92.6 | 7.49 | .41 | 88.6 | 45.0 |
| Average | | | 2.30 | .58 | 92.8 | 5.03 | .29 | 88.3 | 44.8 |

LEGEND:
ESP = Electrostatic precipitator
Sed. = Sediment
ML = Milliliters
Vis. = Viscosity
SSU = Sobolt second units The tables show the recoveries from the coalescer and the ESP with representative oil properties. The viscosity, SSU at 130° F., shows the effect of selective recovery of light ends. The ESP recovers a larger quantity of light ends and water. Sediment is selectively recovered in the coalescer. On start up there are large quantities of sediment which are picked up by the coalescer, but the gas to the ESP remains the same after establishing stable conditions.

Table No. 2

| | Mist Characterization Data | | | | |
|---|---|---|---|---|---|
| Run | Point of Measurement | Loading Lbs/Mscf | Dmmd Microns | Geo. Std. Dev. | Loss Wt. % |
| 1. | Off Gas (in line 31) | 6.37 | 2.3 | 1.96 | 4.3 |
| 1. | Coalescer (in line 42) | 4.20 | 2.0 | 1.80 | 5.6 |
| 1. | ESP (in line 44) | 0.0009 | 1.4 | 7.79 | 5.8 |
| 2. | Off Gas | 6.33 | 2.5 | 1.82 | 4.08 |
| 2. | Off Gas | 4.26 | 2.8 | 1.89 | 4.01 |
| 2. | Coalescer | 3.55 | 2.3 | 1.86 | 2.24 |
| 2. | ESP | 0.019 | 1.9 | 1.84 | 0.4 |
| 3. | Off Gas | 6.58 | 2.7 | 1.85 | 22.86 |
| 3. | Coalescer | 1.89 | 2.0 | 1.88 | 7.04 |
| 3. | ESP | 0.001 | 0.4 | 2.74 | 2.74 |
| 3. | ESP | 0.001 | 0.5 | 2.10 | 2.08 |
| | Average Off Gas | 5.89 | 2.6 | | |
| | Average Coalescer | 3.21 | 2.1 | | |
| | Average ESP | 0.005 | 1.0 | | |

We claim:

1. A process for treating a relatively high temperature gas dispersoid which is the off-gas from retorting particulate oil shale, in which the gas dispersoid contains substantial quantities of a mist of shale oil droplets and dust from the shale comprising:
   (a) passing such a gas dispersoid containing shale oil mist and dust at a predetermined initial velocity downwardly through spray means of a wash oil at a predetermined temperature to provide a gas dispersoid wash oil mixture;
   (b) cooling said wash oil to the predetermined temperature prior to the passing of the gas dispersoid through said spray means;
   (c) providing a sufficient volume of the predetermined temperature wash oil to the volume of the gas dispersoid passing through said spray means to reduce and maintain the temperature of the gas dispersoid at about said predetermined temperature of said wash oil;
   (d) passing the gas dispersoid wash oil mixture through a stage providing a circuitous route and a flow interruption by changing velocity and directions of the gas dispersoid wash oil mixture to essentially remove the dust and a portion of the shale oil mist and the wash oil from the gas dispersoid wash oil mixture and reduce the shale oil mist content of the gas dispersoid to about half of the original gas dispersoid content;
   (e) passing said removed dust and a part of the portion of the shale oil mist and the wash oil to a product oil line;
   (f) discharging the resultant gas dispersoid from said stage at a velocity lower than said initial velocity;
   (g) passing the lower velocity gas dispersoid through an electrostatic precipitator to essentially remove the remaining oil mist and wash oil from the gas dispersoid producing a clean gas; and,
   (h) passing the oil removed from the gas dispersoid in the electrostatic precipitator to the product oil line.

2. A process according to claim 7, wherein said spray means is a plurality of generally flat, conical sprays.

3. A process according to claim 1, wherein a part of said removed portion of the shale oil mist and the wash oil from said stage is recycled as the wash oil.

4. A process according to claim 1, wherein said stage removes the shale oil droplets having an average size of 2.1 microns.

5. A process according to claim 1, wherein said predetermined temperature is from 125° to 150° F.

6. A process according to claim 1, wherein said spray means is a series of generally flat conical sprays with each spray of the series arranged in a generally flat cone so that the gas dispersoid is passed at said initial velocity through said series of sprays to thereby subject the gas disersoid to a plural treatment of the wash oil.

* * * * *

UNITED STATES PATENT OFFICE
CERTIFICATE OF CORRECTION

PATENT NO. : 4,145,191

DATED : March 20, 1979

INVENTOR(S) : Kumar S. Kunchal; Louis J. Erck and Harry A. Harris

It is certified that error appears in the above-identified patent and that said Letters Patent are hereby corrected as shown below:

Col. 3, line 58, change "feed" to --feet--

Claim 2, line 26, change "claim 7" to --claim 1--

Signed and Sealed this

Twenty-sixth Day of June 1979

[SEAL]

Attest:

RUTH C. MASON
Attesting Officer

DONALD W. BANNER
Commissioner of Patents and Trademarks